Jan. 18, 1955    J. F. EDINBOROUGH ET AL    2,699,967
TRACTOR CARRIED SPRAY EQUIPMENT
Filed Aug. 3, 1953

INVENTOR.
John F. Edinborough
Dwight L. Huey
BY
ATTORNEY.

United States Patent Office 2,699,967
Patented Jan. 18, 1955

2,699,967

TRACTOR CARRIED SPRAY EQUIPMENT

John F. Edinborough and Dwight L. Huey, Gooding, Idaho, assignors of one-third to Clifton A. Craig, Kansas City, Mo.

Application August 3, 1953, Serial No. 372,018

5 Claims. (Cl. 299—30)

This invention relates to agricultural equipment and more particularly to an attachment for tractors and the like, the primary object being to provide an inexpensive, compact, readily adjustable spray unit having a vertically reciprocable head upon which a plurality of spray nozzles are mounted, the height of the head being controllable from the seat of the tractor.

It is the most important object of the present invention to provide spray equipment for tractors readily attachable thereto and removable when desired, and including a head having an elongated, horizontal spray conduit therethrough, together with liquid inlet means attached to the conduit, there being a pair of vertical guides at the front of the tractor for reciprocably mounting the head so that the height of the spray nozzles of the conduit may be adjusted to suit varying conditions of use.

Other objects include the way in which the guides are provided with a U-shaped member at the lowermost end thereof having legs that extend into tubes on a support secured to the tractor so that the legs and the head thereon may be quickly removed from the support; the way in which the tubular guides receive a U-shaped element at the uppermost end thereof which in turn receives a pulley through which passes a control cable secured to the reciprocable head; the manner of providing a 4-way pipe through the head for proper distribution of the spray to the various nozzles of the equipment; and other more minor objects all of which will be made clear as the following specification progresses, reference being had to the accompanying drawing, wherein:

Figure 1:
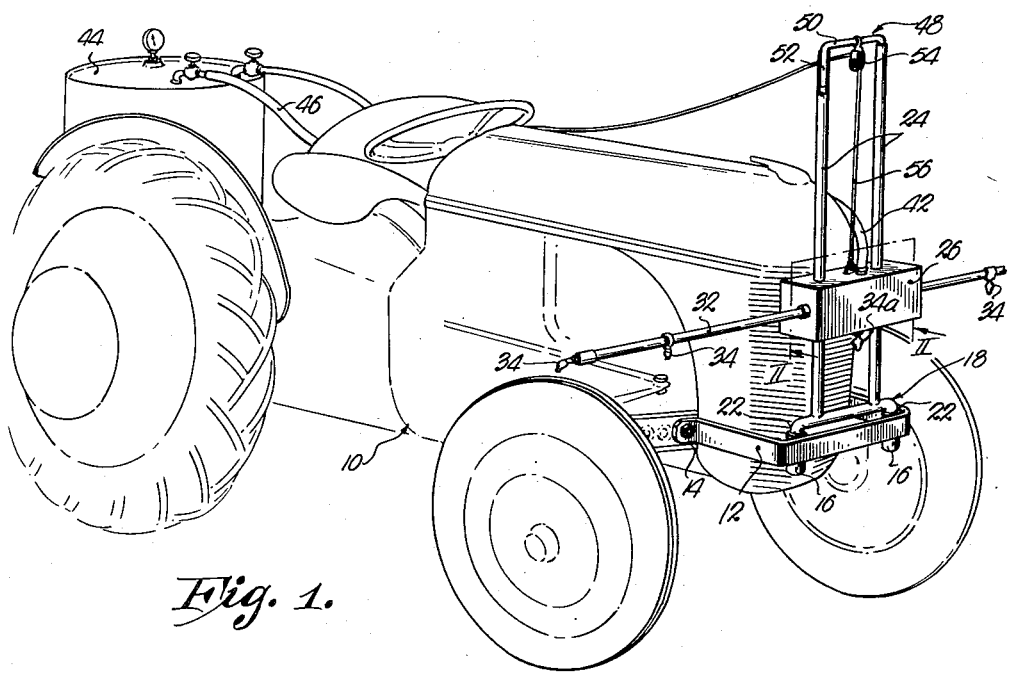
Figure 1 is a perspective view of tractor carried spray equpiment made pursuant to the present invention showing the same operably mounted upon a tractor.
Figure 2:
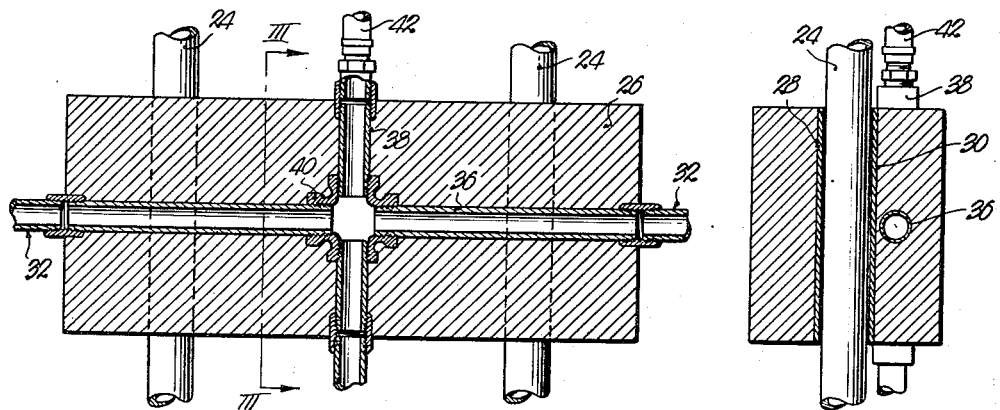
Fig. 2 is an enlarged, vertical, cross-sectional view taken on line II—II of Fig. 1.
Figure 3:
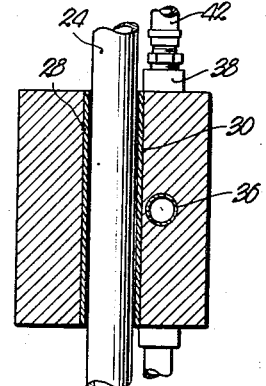
Fig. 3 is a cross-sectional view taken on line III—III of Fig. 2.

Any suitable means depending upon the nature of the tractor with which the spray equipment hereof is used, may be provided as a support for the attachment hereof. In Fig. 1 of the drawing there is shown a tractor broadly designated by the numeral 10 having a support 12 in the nature of a substantially U-shaped bracket, bolted or otherwise affixed as at 14 to the tractor 10 at the forwardmost end thereof.

The support 12 has a pair of spaced, vertical tubes 16 rigid thereto for receiving a U-shaped member broadly designated by the numeral 18, and including a horizontal bight 20 and a pair of legs 22 that extend into the tubes 16.

A pair of spaced, vertical, tubular guides 24 are mounted rigidly to the bight 20 for reciprocably mounting a unitary head or block 26. Head 26 has openings 28 therein that in turn receive bushings 30 surrounding the guides 24.

A horizontal conduit broadly designated by the numeral 32, and provided with a plurality of spray nozzles 34 throughout the length thereof, extends through the head 26.

A 4-way pipe within the head 26 includes a horizontal branch 36 forming a part of the conduit 32 and a vertical branch 38 in intersecting relationship to the branch 36. The branches 36 and 38 are interconnected by a 4-way coupling 40 and the lowermost end of the branch 38 terminates in a nozzle 34a. The upper end of the branch 38 serves as a liquid inlet means and has a flexible conduit such as a hose 42 coupled therewith. Hose 42 extends to a liquid supply tank 44 and liquid such as a herbicide is conveyed to the branch 38 through use of a suitable pump not shown, and connected with the tank 44 by way of line 46.

The uppermost ends of the tubular guides 24 are interconnected by a U-shaped element 48 having a horizontal bight 50 and a pair of downturned arms 52 that extend into the tubular guides 24. The element 48 carries a ratchet pulley 54 around which is trained a cable 56 having one end thereof attached to the head 26 and the opposite end thereof terminating adjacent the seat of the tractor 10. The ratchet pulley 54 is of such nautre as to releasably grip the cable 56 and hold the head 26 and its component parts, at preselected heights with respect to the guides 24.

It is seen that the operator of the tractor may quickly and easily position the nozzles 34 and 34a at the desired height depending upon the height of the weeds and other growth being sprayed with the equipment hereof.

Figure 4:
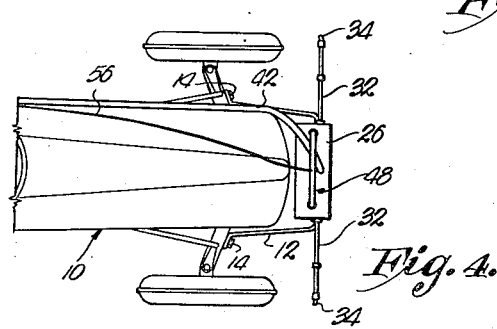
Fig. 4 is a top-plan view of the forward portion of a tractor showing the spray equipment mounted thereon.

Under normal working conditions the head 26 is lowered to engagement with member 18 and nozzles 34 and 34a are forwardly of the front wheels of the tractor 10 as shown in Fig. 4.

When it is desired to remove the equipment from the tractor, guides 24 are lifted to a point where the legs 22 clear the tubes 16 and the entire attachment is thereby rendered removable as a unit from the support 12.

Having thus described the invention what is claimed as new and desired to be secured by Letters Patent is:

1. In spray equipment for tractors, a support; means adapting the support for attachment to a tractor; a pair of vertical guides; structure mounting the guides on the support; a unitary block having openings therethrough, said openings receiving the guides for vertical reciprocation of the block on the guides; a horizontal conduit extending through the block and provided with a plurality of spray nozzles; liquid inlet means coupled with the conduit within the block; and apparatus interconnecting the block and the guides for raising and lowering the block and the conduit as a unit with respect to the guides.

2. In spray equipment as set forth in claim 1 wherein said block is provided with a four-way pipe including a horizontal branch forming a part of said conduit and a vertical branch intersecting the horizontal branch and communicating therewith at the point of intersection, the upper end of said vertical branch forming said liquid inlet means, there being a spray nozzle on the lower end of the vertical branch.

3. In spray equipment for tractors, a support; means adapting the support for attachment to a tractor; a pair of tubular, vertical guides; structure mounting the guides on the support; a head having openings therethrough, said openings receiving the guides for vertical reciprocation of the head on the guides; a horizontal conduit extending through the head and provided with a plurality of spray nozzles; liquid inlet means coupled with the conduit; apparatus interconnecting the head and the guides for raising and lowering the head and the conduit as a unit with respect to the guides; and a U-shaped element having a horizontal bight and a pair of down-turned arms, said arms extending into the guides at the uppermost ends of the latter, said apparatus including a pulley attached to the bight of said element, a cable trained around the pulley, and means attaching one end of the cable to the head.

4. In spray equipment for tractors, a support; means adapting the support for attachment to a tractor; a U-shaped member having a horizontal bight and a pair of down-turned legs; a pair of vertical guides; structure mounting the guides on said bight; a head having openings therethrough, said openings receiving the guides for vertical reciprocation of the head on the guides; a horizontal conduit extending through the head and provided with a plurality of spray nozzles; liquid inlet means coupled with the conduit; apparatus interconnecting the head and the guides for raising and lowering the head and the conduit as a unit with respect to the guides; and tubes secured to the support for receiving said legs whereby the member, the guides, the head and the conduit may be releasably mounted on the support.

5. In spray equipment as set forth in claim 4 wherein is provided a U-shaped element having a horizontal bight and a pair of down-turned arms, said arms extending into the guides at the uppermost ends of the latter, said apparatus including a pulley attached to the bight of said element, a cable trained around the pulley, and means attaching one end of the cable to the head.

References Cited in the file of this patent

UNITED STATES PATENTS

| | | |
|---|---|---|
| 1,526,642 | Nissley | Feb. 17, 1925 |

FOREIGN PATENTS

| | | |
|---|---|---|
| 594,269 | Great Britain | Nov. 6, 1947 |